ELECTRICAL COUPLING SYSTEM FOR MAGNETOSTRICTIVE ELEMENTS

Filed April 30, 1948

INVENTORS
Hugh L. Donley &
Chandler Wentworth
BY [signature]
ATTORNEY

Patented Oct. 9, 1951

2,571,019

UNITED STATES PATENT OFFICE 2,571,019

ELECTRICAL COUPLING SYSTEM FOR MAGNETOSTRICTIVE ELEMENTS

Hugh L. Donley and Chandler Wentworth, Princeton, N. J., assignors to Radio Corporation of America, a corporation of Delaware Application April 30, 1948, Serial No. 24,373

10 Claims. (Cl. 250—36)

Figure 1:
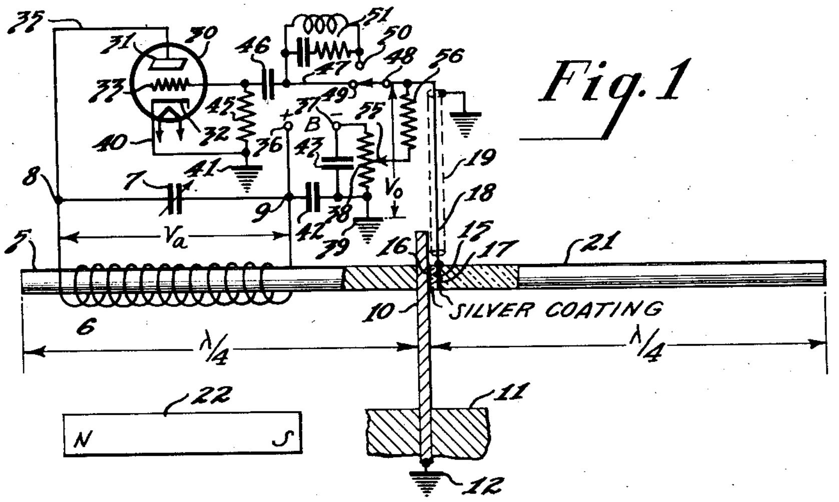

The present invention relates to an electrical coupling system for magnetostrictive elements, such as magnetostrictive rods and cores for oscillator coils and other tunable inductive circuit elements, which is operated to derive or develop an output voltage or signal therefrom as the result of magnetostrictive vibration.

It is a primary object of the invention, to provide an improved method and means for directly coupling electrically to a magnetostrictive rod or core to generate an electrical signal or voltage in response and directly proportional to the frequency and magnitude of the vibration of the rod or core, without introducing other undesired coupling effects, and at higher magnetostrictive operating frequencies than has heretofore been possible.

From a circuit viewpoint, one disadvantage in the use of magnetostrictive rods or cores is the necessity for coupling to such mechanically resonant elements magnetically or inductively, which becomes increasingly difficult as the frequency of operation of the magnetostrictive elements is increased, due mainly to the fact that the amplitude of vibration is correspondingly reduced with resulting decreased effective output potential to be derived through such magnetic or inductive coupling means.

Furthermore, to provide adequate inductive coupling with a magnetostrictive element, the coupling means such as a coil or winding, must be closely inductively associated with the magnetostrictive element, and this introduces the problem of eliminating undesired capacity coupling with the element and with the driving means therefor, which may comprise an inductive winding forming part of a tuned circuit connected with an electron discharge oscillator device or tube.

It is, therefore, a further object of this invention to provide an improved electrical coupling system for magnetostrictive elements which is responsive to the mechanical force or pressure exerted by a resonant magnetostrictive element, whereby it is substantially independent of the frequency or amplitude of vibration of the element, and which provides adequate shielding without interfering with the efficient operation thereof.

It is also a further object of the invention, to provide an improved electrical coupling system for magnetostrictive vibratory elements which operates to translate the amplitude and frequency of vibration of a magnetostrictive element into mechanical force or pressure and to apply such pressure to a pressure responsive electrical generating means which may be incorporated directly in the vibrational system without interfering with the frequency response thereof, and which at the same time provides a relatively high electrical output directly proportional to the amplitude and frequency of vibration of the element.

With this system it will be seen, that the limitations imposed upon prior known coupling systems embodying inductive or magnetic coils or windings associated with the magnetostrictive elements, and limiting the coupling effect at higher frequencies, may entirely be obviated by a coupling system embodying the invention, while at the same time retaining all of the advantages of direct coupling with the magnetostrictive element.

A system embodying the invention, therefore, partakes of the nature of a translating system or transducer arrangement for converting the vibration of a magnetostrictive element into mechanical force or pressure which may be exerted in a direction to modulate or control a pressure responsive generator device such as a piezoelectric element when such element is of such size that it may be introduced into the vibratory system without impairing or modifying the frequency response thereof.

Further in accordance with the invention, it has been found that titanate ceramic material, such as polarized barium titanate ceramic material, may be utilized as the pressure responsive element in such a system without introducing undesired resonances, and the invention has for its further object to provide an improved electrical coupling system of the character referred to which utilizes a thin plate of titanate ceramic having electrodes on opposite faces as a pressure responsive generator, and wherein the mounting means for the mechanically resonant elements including a magnetostrictive element, provides for imparting a maximum mechanical force or pressure to the generating device or generator, while at the same time eliminating the capacity coupling between the generating device and the magnetostrictive element and its exciting source, such as a winding or coil in a tunable circuit.

Further in accordance with the invention, a thin titanate ceramic plate, such as barium titanate, is provided as a piezo-electrically active element in a mechanical system at a nodal point in a half wave magnetostrictive vibratory structure, part of which comprises the magnetostrictive element per se. The mounting means at the nodal point may comprise a thin plate of conducting material, such as brass or Phosphor-bronze, providing a grounded shield between the piezo-electrically active element and the magnetostrictive element, whereby a maximum mechanical force or pressure may be exerted by the vibratory structure upon the piezo-electric element thereby to provide an output voltage which as a function of the frequency, may yield a response which is characteristic of the Q of the mechanical system. This desirable feature is obtained by utilizing the thin ceramic plate element as an integral part of the mechanical system, since by the direct piezo-electric effect, a voltage is derived which is proportional to the pressure and piezo-electric constant of the material. For barium titanate or like titanate ceramic materials this voltage has been found to be relatively high, particularly when the ceramic is polarized.

From a practical standpoint, the piezo-electric properties of polarized barium titanate and like titanate ceramics rather than the quartz crystal provide effective coupling in a system of the character described for the reason that barium titanate is a ceramic, hence no definite crystal orientation is required for piezo-electric properties to be manifested, the processing of barium titanate and like ceramic materials, such as barium-strontium titanate, may be accomplished at relatively low cost, and thin ceramic plates may readily be equipped with fired-on silver electrodes or coatings for effecting electrical connection with the ceramic plates and for mounting the same.

It may, therefore, be considered to be a still further object of the invention, to provide an improved electrical coupling system for a magnetostrictively driven vibratory which provides a thin piezo-electric titanate ceramic element essentially at a nodal plane in the vibratory structure including the magnetostrictive element, whereby the nodal plane may be fixed and without appreciable motion while a maximum pressure is transmitted to the piezo-electric element to generate a maximum voltage output, because the voltage output is directly proportional to the pressure with such arrangement.

It is also a further and related object of the invention, to provide an improved method and means for directly electrically coupling to a magnetostrictive rod or ferrite core by means of a piezo-electrically active titanate ceramic body such that the mounting means is located at a nodal point of the mechanically structure and also eliminates the capacity coupling between the piezo-electric element and the magneto-strictive element or its exciting source.

The novel features that are considered characteristic of this invention are set forth with particularity in the appended claims. The invention, both as to its organization and method of operation, as well as additional objects and advantages thereof, will best be understood from the following description when read in connection with the accompanying drawing, in which Figure 1 is a schematic diagram including circuit means and mechanical elements in elevation and partially in cross section, showing an electrical coupling system embodying the invention.

Figure 2:
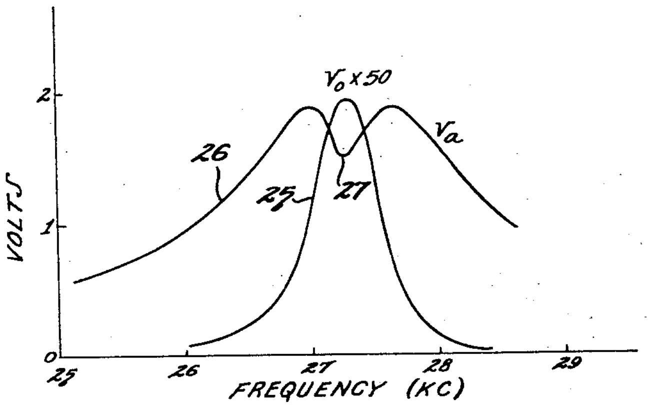
Figure 3:
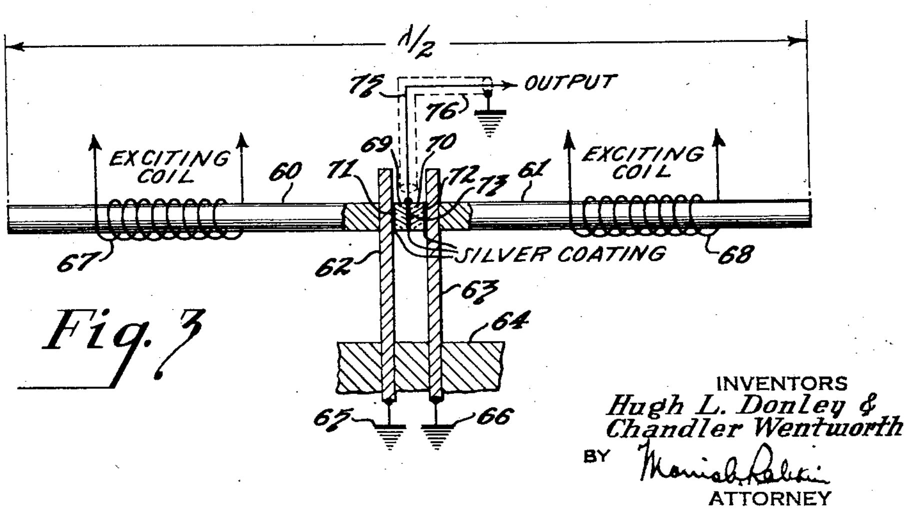

Figure 2 is a graph showing curves illustrating certain operating characteristics of the system shown in Figure 1, and Figure 3 is a schematic diagram of an electrical coupling system embodying mechanical elements in elevation and partially in cross-section showing a modification of the invention as disclosed in Figure 1.

Referring to Figure 1, a magnetostrictive element in the form of a core or rod 5 is excited to resonance by means of a tuned circuit comprising an inductance winding 6 surrounding the core and provided with a shunt variable tuning capacitor 7, the terminals of the circuit being indicated at 8 and 9. The core of the present example may be considered to be of any suitable magnetostrictive material such as ferrite and is mounted to vibrate longitudinally, being secured at one end to a thin vertical plate 10 which is anchored in spaced relation to the core connection in a fixed conducting base 11 which may be connected to ground as indicated at 12. The plate 10 may be of brass, for example, of the order of $\frac{1}{32}$ inch in thickness, and the core or magnetostrictive element 5 may be of the order of less than two inches long, for an embodiment as shown schematically in Figure 1. The core or rod 5 may be secured to the plate 10 by cementing, for example with polyvinyl acetate.

A thin titanate ceramic plate 15 of approximately the same cross sectional size as the core 5, provided with fired-on thin silver coatings or electrodes 16 and 17, is mounted on the opposite side of the plate 10. The electrode 16 is soldered to the plate 10 and is thereby connected to ground, while the opposite electrode 17 is provided with an output conductor 18 connected therewith and provided with a suitable grounded shield 19, for conveying the signal output from the ceramic plate. The latter operates, as will hereinafter be described, as a piezo-electric voltage generator. The conducting plate 10 serves both as a mounting means for the core 5 and as an electrostatic shielding between it and its exciting winding 6, and the ceramic plate 15. It has been found that the elimination of the capacity coupling between the input or exciting circuit of the magnetostrictive resonator and the output circuit is an essential requirement for accurate frequency response, since in general, the voltage obtained from the ceramic or piezo-electric element 15 is relatively low with respect to the exciting voltage applied to the coil 6.

In order that the mechanical resonance be not damped appreciably, the metal shield or mounting means 10 is located at a node or a plane of no motion, for which reason the core 5 is made of the order of ¼ wavelength in length at the desired operating frequency as indicated, and a quarter wave matching section is provided in connection therewith as further shown in Figure 1 to complete the vibrator structure. In the present example, the quarter wave matching section comprises an elongated rod 21 which is preferably of insulating material, for example, it may be a ⅛ inch diameter glass rod. The length of the quarter wave matching section 21 is determined by the velocity of sound in this material as compared with the velocity of sound in the magnetostrictive element 5. In addition, the length of the quarter wave section is influenced by the thickness of the ceramic section used and, accordingly, the length of the two sections is adjusted experimentally to the desired value to produce the zero nodal point of plane at the supporting element 10.

In considering the length of the matching section 21, the thickness of the titanate ceramic element or plate 15 may be disregarded, since it is of relatively short length with respect to the total length of the magnetostrictive element and of the matching section. For example, the titanate ceramic plate may be of the order of ten mils thickness, whereas the ferrite core 5 may be of the order of 1¾ inches long approximately. While the quarter wave matching section 21 has been considered to be of glass or other non-conductor, it may be of any suitable material which will not provide electrical conductive coupling to the high potential electrode 17, thereby to introduce undesired coupling from external electrical sources by inductive or capacitive pick-up to the element 21. The magnetic biasing force for the magnetostrictive element 5 may be provided by any permanent magnet or electro-magnetic means represented by the magnet bar 22 positioned in parallel relation to the magnetostrictive element 5 and having the fixed polarities indicated.

By placing the titanate ceramic generating element 15 essentially at a nodal plane, means that although there is no motion in this plane, maximum pressure is transmitted to the element so that maximum voltage output is obtained because the voltage output is directly proportional to the pressure. It has been found that a thin plate of barium titanate or other titanate ceramic material is capable of generating a voltage between electrodes when the plate is subjected to pressure variations, and the voltage output is enhanced when a biasing potential is applied between the electrodes. In the present example, this may be applied between the ground connection 12 and the output lead 19 to maintain a constant D.-C. biasing potential between the electrodes. One arrangement for applying such biasing potential will hereinafter be described in connection with Figure 1.

The quarter wave vibratory structure comprising the two quarter wave sections, being the magnetostrictive rod 5 and the glass rod 21, together with the plate 15, will vibrate at a frequency determined by the resonance frequency of the rod 5, when excited by the circuit 6—7, and the maximum amplitude of vibration is obtained when substantially an exact impedance match is obtained between the two sections and at the same time a maximum pressure will be exerted upon the ceramic plate 15, thereby to produce a maximum voltage output.

Referring to Figure 2, the voltage output Vo is maximum at the resonance frequency of the ferrite core or magnetostrictive rod 5, which is evidenced by a sharp reduction in the voltage V*a* across the exciting circuit between the terminals 8 and 9. This relation is shown in Figure 2 by a curve 25 which is plotted with respect to voltage and frequency to indicate the voltage Vo multiplied by 50, and the curve 26 drawn with respect to the same voltage and frequency scale indicates the voltage V*a*. It will be noted that the voltage Vo is maximum at the resonance frequency of the magnetostrictive system which is indicated by a dip or valley 27, since at the resonance frequency of the magnetostrictive element, maximum reaction on the tuned circuit occurs.

The system shown in Figure 1 may be utilized to provide an output voltage proportional to the amplitude and frequency of vibration of the rod 5 in any suitable manner and may readily be utilized in a frequency stabilized oscillator by feeding back to the grid of the oscillator the output voltage from the ceramic generator 15, while the exciting winding is connected in the oscillator anode circuit.

The arrangement above referred to is provided in Figure 1 through coupling with an oscillator tube 30, which may be a simple triode as shown, having an anode 31, a cathode 32, and a control grid 33. The anode 31 is connected through a lead 35 to the terminal 8 of the exciting circuit for the magnetostrictive element and the anode circuit is then completed through the winding 6 to the terminal 9, which in turn is connected to the positive terminal 36 of an anode potential supply means (not shown) and indicated at B. The negative terminal of the supply source indicated at 37 is connected through a potential dropping resistor 38 to ground, as indicated at 39, to which the cathode is also connected through a lead 40 and a ground connection indicated at 41, thus completing the anode circuit. The terminal 9 is bypassed to ground through a bypass capacitor 42, and likewise the potential dropping resistor 38 is provided with a suitable bypass capacitor 43 for currents at the frequency of the oscillator.

The grid 33 of the oscillator is connected to ground through a grid resistor 45 and is connected to the output lead 18 of the titanate ceramic generator 15 through a grid coupling capacitor 46, a conductor 47, a switch 48 and switch contact 49 serially as shown. The switch or arm 48 may be moved to a second contact 50 to provide a circuit through a phase changing network 51 which is connected to the lead 47 to permit of the introduction of a phase changing network in the grid circuit between the coupling capacitor 46 and the feedback connection from the lead 18.

With the system shown, the tunable circuit comprising the capacitor 7 and the inductance or exciting winding 6, is tuned approximately to the resonant frequency of the mechanical system and being in the anode circuit of the oscillator, supplies energy to the magnetostrictive element to cause it to vibrate at that frequency. The voltage generated as the result of pressure application to the titanate ceramic plate 15 is conducted through the lead 18, the switch 48—49 and the coupling capacitor to the triode 43, thereby providing energy or voltage feedback for sustaining oscillations, and because of the high efficiency and frequency response of the feedback coupling, the oscillator may be maintained in oscillation with a minimum of feedback voltage.

It has been found that the frequency stability of the oscillator is effectively controlled by the mechanically resonant structure or rod 5, by varying the adjustment of the tuning capacitor 7 by as much as an 8 to 1 variation and obtaining a frequency stability of about one per cent. Furthermore, a frequency stability of about two per cent is obtained for a 3 to 1 change in anode supply voltage at the terminals 36—37.

It will be noted that in the present circuit, a ready means is provided for supplying biasing potential to the ceramic plate 15 by the anode current flow through the dropping resistor 38. One end of the resistor 38 is connected to ground and, therefore, to the supporting plate 10 and the electrode 16. To apply potential to the electrode 17, the dropping resistor 38 is provided with a variable tap connection 55 which is connected through a decoupling high impedance resistor 56 to the lead 18, thereby providing a conductive connection from the resistor 38 to the electrode 17.

With this arrangement, the potential existing between the tap connection 55 and ground is applied between the electrodes 16 and 17 and may be adjusted to any desired value by movement of the tap connection 55. However, any other suitable D.-C. biasing arrangement may be provided for the ceramic plate 15 which is adapted for connection with the electrodes without appreciably damping the high potential connection from the lead 18. In the present example, the resistor 56 is of relatively high value of the order of several megohms to insure decoupling of the feedback connection from the potential supply means 38 and 55.

Although the phase shift resulting from the use of the tuned circuit 6—7 and the 90° phase shift from the tuned circuit to the piezo-electric ceramic element 15 is sufficient to maintain a stable frequency, increased stability may be obtained by inserting in the oscillator grid circuit a phase shifting network, such as the network 51, to bring the phase difference between the plate and grid voltages more nearly to the theoretical 180°. In th present example, this phase shift may be effected by closing the switch arm 48 to the contact 50. It has also been found that the coupling between the exciting tuned circuit 6—7 and the magnetostrictive element 5 may improve the oscillator frequency stability. However, for practical purposes unless the ultimate in stability inherent in the magnetostrictive element is desired, these additional precautions are not ordinarily necessary.

An advantage in the use of an oscillator as shown in Figure 1. is its inherent simplicity in that only one exciting coil is necessary, which is part of the tuned anode circuit, and a polarized relatively small titanate ceramic element of thin cross section may be used as the feedback generating element for direct coupling with the magnetostrictive element, thereby eliminating the usual form of coupling comprising additional inductive coil elements and the like.

A further and important advantage obtained from the use of a magnetostrictive vibratory coupling system embodying the invention, lies in the fact that it is possible to operate the magnetostrictive element at high frequencies than has heretofore been possible or conceived of which magnetostrictive oscillators, since in accordance with the invention, the feedback or output voltage is derived from a generating element directly coupled to the resonant element or magnetostrictive bar or rod, and electrostatically shielded therefrom.

A further modification of the invention, to provide a push-pull signal output, is shown in Figure 3, to which attention is now directed. Two magnetostrictive rods 60 and 61 are arranged in coaxial relation to each other on opposite sides of a dual supporting structure comprising a plate of conducting material 62 in spaced parallel relation to a second plate of conducting material 63, both of which are anchored in a fixed conducting support 64 and connected to ground as indicated at 65 and 66 respectively. The supporting plates 62 and 63 are interposed between the adjacent ends of the magnetostrictive rods 60 and 61 respectively, and the rods are secured to the plates as shown, substantially in the same manner as described in connection with the arrangement of Figure 1.

Each of the rods or magnetostrictive elements is provided with exciting coils indicated at 67 and 68 respectively, which may be connected to any suitable source of energy such as an oscillator circuit as in the embodiment of Figure 1. Interposed between the plates 62 and 63 are a pair of titanate ceramic bodies or plates 69 and 70, of substantially the same cross sectional area as the rods 60 and 61 and being relatively thin as in the preceding embodiment to occupy a relatively short axial length along the vibratory structure. The plates 69 and 70 are provided with fired-on silver electrodes, as in the preceding example, which are indicated at 71, 72 and 73, the latter referring to two electrodes on the opposing faces of the ceramic plate. These are joined to an output conductor 75 suitably shielded as indicated by the dotted lines 76 and leading to any utilization means (not shown).

Although two separate exciting coils 67 and 68 are shown, they may be connected in any suitable manner with due regard to phase, and may be driven from any suitable source. Likewise, it will be seen that the combined shield and support provided by the plates 62 and 63 serve to isolate or shield the voltage generating means from the magnetostrictive elements and their exciting circuits as in the preceding example. The use of two magnetostrictive elements and two coils is of advantage at higher frequencies where the magnetostrictive elements 60 and 61 may become extremely short and difficulty is experienced in coupling to the exciting circuits.

As in the preceding embodiment of the invention, it should be noted that the shield plates 62 and 63 and the ceramic plates 69 and 70 may be relatively thin in comparison with the length of the magnetostrictive elements, so that the thickness of the supporting means and of the ceramic plates is a small percentage of the total overall length of the vibratory system, thereby realizing the high Q or efficiency inherent in such a mechanically resonant system.

In operation, the coils 67 and 68 are excited at a frequency corresponding to the resonant frequency of the magnetostrictive elements, each of which provides a matching section for the other, for maximum efficiency of vibration and with a minimum of input energy, and the operation is such that the nodal point at the support and passing through the ceramic plates, serves to subject the plates wholly to maximum pressure whereby maximum voltage is produced. The resulting vibration produces an output voltage between the output lead 75 and ground from both ceramic bodies in parallel, thereby enhancing the piezo-electric action and improving the response of the system. D.-C. polarizing potential may be applied to the electrodes in any suitable manner, for example as shown in the circuit of Figure 1.

From the foregoing description, it will be seen that in accordance with the invention, there is provided an improved method and means for directly coupling electrically to a magnetostrictive rod or ferrite core or other magnetostrictive element by means of a piezo-electrically active ceramic body such as barium titanate, and that the mounting means for the mechanically resonant system is located at a nodal point between quarter wave sections for maximum vibrational efficiency and further that undesired capacity coupling between the piezo-electric element and the magnetostrictive element or the exciting source may entirely be eliminated by the shielding provided by the supporting structure.

By placing a thin ceramic plate with electrodes on opposite faces thereof at the nodal point of the magnetostrictive vibratory system, maximum pressures are developed by reason of the fact that there is no motion at this point or plane and the pressure is transmitted to the ceramic plate so that maximum voltage output is obtained, because the voltage output is directly proportional to the pressure. This system may be utilized to provide a frequency stabilized oscillator by feeding back to the grid of the oscillator tube the output voltage derived from the piezo-electrically active element, where the LC tuned circuit in the plate of the oscillator is tuned approximately to the resonant frequency of the mechanical system and utilized to excite the system through coupling with the magnetostrictive section thereof.

We claim as our invention:

1. A vibratory structure comprising a rod of magnetostrictive material, a rod of dielectric insulating material coaxially aligned with said rod of magnetostrictive material, each of said rods being substantially one quarter wavelength in length, and means mechanically coupling said rods in end to end relationship including a relatively thin plate of a titanate ceramic having electrodes on opposite faces thereof and located between the adjacent ends of said rods to receive maximum pressure therefrom in response to magnetostrictive vibration thereof.

2. A vibratory structure as defined in claim 1, wherein the vibratory structure is supported by a conducting shield plate interposed between the titanate ceramic plate and the magnetostrictive rod.

3. A stabilized magnetostrictive oscillator system comprising in combination, a magnetostrictive rod, an electronic tube oscillator having a tunable anode circuit inductively coupled to said rod to apply an exciting force thereto, a grid circuit for said oscillator, a matching section of insulating material for said magnetostrictive rod coupled thereto at one end co-extensively therewith to provide a half wave vibratory structure, a shield plate jointly supporting said magnetostrictive rod and said matching section at a nodal plane between them, a thin plate of titanate ceramic material having electrodes on opposite faces thereof mounted between said shield plate and said matching section to provide an output voltage at said electrodes in response to magnetostriction vibration of said structure, and electrical circuit connections for applying said voltage to the grid circuit of said oscillator to sustain oscillations in said system.

4. A stabilized magnetostrictive oscillator system as defined in claim 3, wherein electrical circuit connections are provided for applying D.-C. biasing potential to the electrodes on opposite sides of the ceramic plate.

5. A stabilized magnetostrictive oscillator system as defined in claim 3, wherein a phase changing network is provided in the oscillator grid circuit to establish a 180° phase shift between the oscillator grid and anode circuits.

6. A mechanical vibratory system comprising a magnetostrictive rod, a matching rod of nonconducting material in coaxial extension of said first rod, both said rods being substantially one quarter wavelength long at the desired operating frequency, a plate of titanate ceramic material interposed between said rods and forming part of the vibratory system, and a supporting element for the system providing an electrical shield interposed between the magnetostrictive rod and the ceramic plate, said supporting element, ceramic plate and said rods being joined to provide a unitary half-wave vibratory structure, and means providing electrodal coupling with said ceramic plate to derive output voltages therefrom and to apply a biasing potential thereto.

7. A mechanical vibratory system comprising in combination, a pair of magnetostrictive rods in end to end coaxial relation, a pair of spaced conducting shield plates connected one with each of the adjacent ends of said rods to provide a supporting structure for said rods, at least one plate of titanate ceramic material interposed between said shield plates for receiving pressure variations therefrom in response to magnetostrictive vibration of said rods, exciting means for each of said rods, and means providing electrodal coupling with said ceramic plate to derive output voltages therefrom and to apply biasing potentials thereto.

8. A mechanical vibratory system as defined in claim 7, wherein a pair of titanate ceramic plates are interposed between said shield plates in face to face engagement with each other, and the electrodal coupling means comprises conductive coatings on adjacent faces having a common electrical output connection, and conductive coatings on the outer faces in electrical contact with said shield plates, and an electrical output connection for each of said last named plates.

9. In a magnetostrictive device, the combination with a rod-like magnetostrictive element and exciting means therefor, of a direct electrical coupling means therefor comprising an electrical shield plate supporting said element at one end, a matching rod-like element in coaxial extension of said first named element and providing therewith a half wave vibratory structure with the shield plate at a motion nodal point therein between said elements, and a pressure responsive voltage generating device comprising a thin plate of titanate ceramic material having conductive electrodal areas on opposite faces thereof interposed between said matching element and the shield plate, to form an integral part of the vibratory structure, said titanate ceramic material being electrically shielded from said magnetostrictive element and said exciting means by said shield plate, and receiving pressure resulting from magnetostrictive vibration of the structure to provide a voltage output proportional to the pressure.

10. An electrical coupling system for magnetostrictive elements comprising a mechanically resonant half wave structure at least one quarter wave portion of which is made of magnetostrictive material, a relatively thin plate of piezo-electric material having electrodes on opposite faces thereof, said piezo-electric material being mounted substantially at a central nodal point of said half wave structure to receive maximum pressure in response to magnetostrictive vibration of said structure, a supporting and conducting shield plate interposed between said thin plate of piezoelectric material and said magnetostrictive material, and means to derive a voltage from said piezo-electric material connected to its electrodes.

HUGH L. DONLEY.
CHANDLER WENTWORTH.

REFERENCES CITED

The following references are of record in the file of this patent:

UNITED STATES PATENTS

| Number | Name | Date |
|---|---|---|
| 1,900,038 | Bower | Mar. 7, 1933 |
| 2,091,250 | Blackman | Aug. 31, 1937 |
| 2,101,272 | Scott | Dec. 7, 1937 |